United States Patent [19]

Hooriani

[11] Patent Number: 5,135,153
[45] Date of Patent: Aug. 4, 1992

[54] DESOLDERING DEVICE

[76] Inventor: Ramin Hooriani, 4942 New Castle Ave., Encino, Calif. 91316

[21] Appl. No.: 699,262

[22] Filed: May 13, 1991

[51] Int. Cl.⁵ .............................................. B23K 1/00
[52] U.S. Cl. ...................................... 228/20; 15/344
[58] Field of Search ................. 228/20 R, 20 HT, 21; 15/341, 344

[56] References Cited

U.S. PATENT DOCUMENTS

| | | | |
|---|---|---|---|
| 4,206,864 | 6/1980 | Rauchwerger | 15/344 X |
| 4,292,706 | 10/1981 | Fortune | 228/20 HT X |
| 4,660,249 | 4/1987 | Popovic | 228/20 HT X |
| 5,031,817 | 7/1991 | Chen | 228/20 |

Primary Examiner—Richard K. Seidel
Assistant Examiner—Patty E. Hong
Attorney, Agent, or Firm—Robert M. Sperry

[57] ABSTRACT

An improved solder removal device having means for automatically recocking the device after each use. A piston is slidably movable within a barrel and normally urged upward by a spring. The piston shaft projects upwardly from the piston and has a toothed area extending along one side which is engaged to a movable gear. The movable gear is mounted on a gear shaft which rotates in a bearing mounted to the shaft of a solenoid. A motor is mounted within the barrel and is operable, through suitable gearing to rotate the movable gear, thereby moving the piston shaft. The piston shaft also carries a pair of studs actuated by a trigger slide engageable with an arm of a switch to control actuation of the solenoid and motor. Upward movement of the piston creates a vacuum at the nozzle which removes excess molten solder. Electricity can be supplied from either a line source or a battery.

12 Claims, 2 Drawing Sheets

DESOLDERING DEVICE

BACKGROUND

1. Field of Invention

This invention relates to solder removal devices and is particularly directed to a solder removal device which can be repeatedly rearmed to permit successive use.

2. Prior Art

In the production of electronic apparatus, it is frequently necessary to make a plurality of solder connections in proximity to adjacent connection sites, where connections have been made previously or where they may be made in the future. In either event, excess solder from the current connection site may flow onto the adjacent sites and may disrupt existing connections or may result in the unintentional making of erroneous connections. If the excess solder is allowed to harden in the undesired locations, it becomes much more difficult to remove and may necessitate unsoldering and resoldering one or more previously made connections. Such reconnection is time-consuming and often results in the destruction of components, which increases production costs, and is also extremely stressful for the workers. In order to avoid these problems, solder removal devices have been proposed which can be used to remove the excess solder before it can harden or which can quickly remove remelted solder. Conventionally, these solder removal devices have been pen-like devices having a hollow barrel formed with a small nozzle projecting from one end of the barrel and having a spring-loaded piston within the barrel, which could be manually cocked and having a trigger which could be pressed to release the piston, causing the spring to drive the piston upward within the barrel to create a vacuum within the barrel to suck molten solder from an undesired location into the nozzle and, hence, into the barrel. However, recocking of these prior art devices for subsequent use has frequently been a two-hand operation, requiring that the device be held in one hand and cocked with the other. Consequently, it has been necessary for the user to set down his soldering iron or, at least, divert his attention from the soldering operation, in order to perform the recocking operation. However, several seconds are required to enable the operator to set down the soldering iron, perform the recocking operation and pick up the soldering iron again. This allows the solder to harden, which requires remelting, and tends to be distracting to the operator, which may interfere with the operator's concentration, especially during particularly demanding soldering operations. Furthermore, this procedure must be repeated many times during any production shift, which amounts to significant production losses over a period of time.

A search in the United States Patent Office has revealed the following references:

| U.S. Pat. No. | INVENTOR | ISSUED |
| --- | --- | --- |
| 3,263,889 | W. S. Fortune | Aug. 2, 1966 |
| 3,114,026 | W. S. Fortune | Dec. 10, 1963 |
| 3,543,990 | W. S. Fortune | Dec. 1, 1970 |
| 3,549,078 | W. S. Fortune | Dec. 22, 1970 |
| 3,818,539 | W. S. Fortune | Jun. 25, 1974 |
| 3,862,468 | W. S. Fortune | Jan. 28, 1975 |

Each of these references is subject to the disadvantages discussed above. Thus, none of the prior art solder removal devices have been entirely satisfactory.

BRIEF SUMMARY AND OBJECTS OF INVENTION

These disadvantages of the prior art are overcome with the present invention and an improved solder removal device is provided which is simple and inexpensive to produce, yet which is self-rearming to permit substantially unlimited successive solder removal operations to be performed without requiring the operator to interrupt his soldering operations.

These advantages of the present invention are preferably attained by providing an improved solder removal device having means for automatically recocking the device after each use.

Accordingly, it is an object of the present invention to provide an improved solder removal device.

Another object of the present invention is to provide an improved solder removal device which is simple and inexpensive to produce.

Another object of the present invention is to provide an improved solder removal device which is capable of repeated use without requiring manual recocking between each use.

A further object of the present invention is to provide an improved solder removal device which allows the operator to perform a plurality of solder removal operations without interruptions for manually recocking the device.

An additional object of the present invention is to provide an improved solder removal device which allows the operator to perform a plurality of solder removal operations without loss of time for recocking the device between successive uses.

A specific object of the present invention is to provide an improved solder removal device having means for automatically recocking the device after each use.

These and other objects and features of the present invention will be apparent from the following detailed description, taken with reference to the figures of the accompanying drawings.

DETAILED DESCRIPTION OF THE INVENTION

Figure 1:
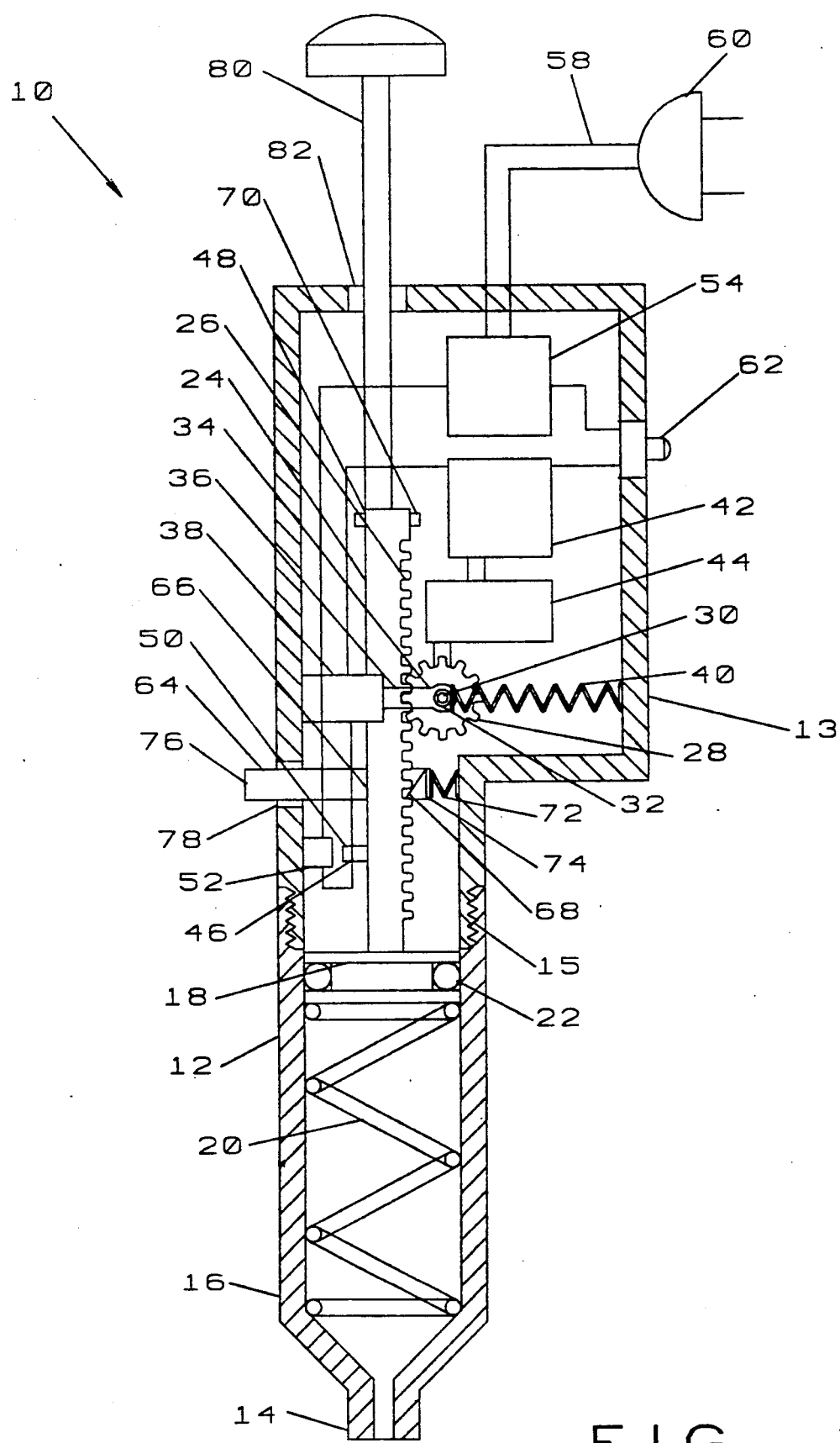
FIG. 1 is a sectional view through a solder removal tool embodying the present invention.
Figure 2:
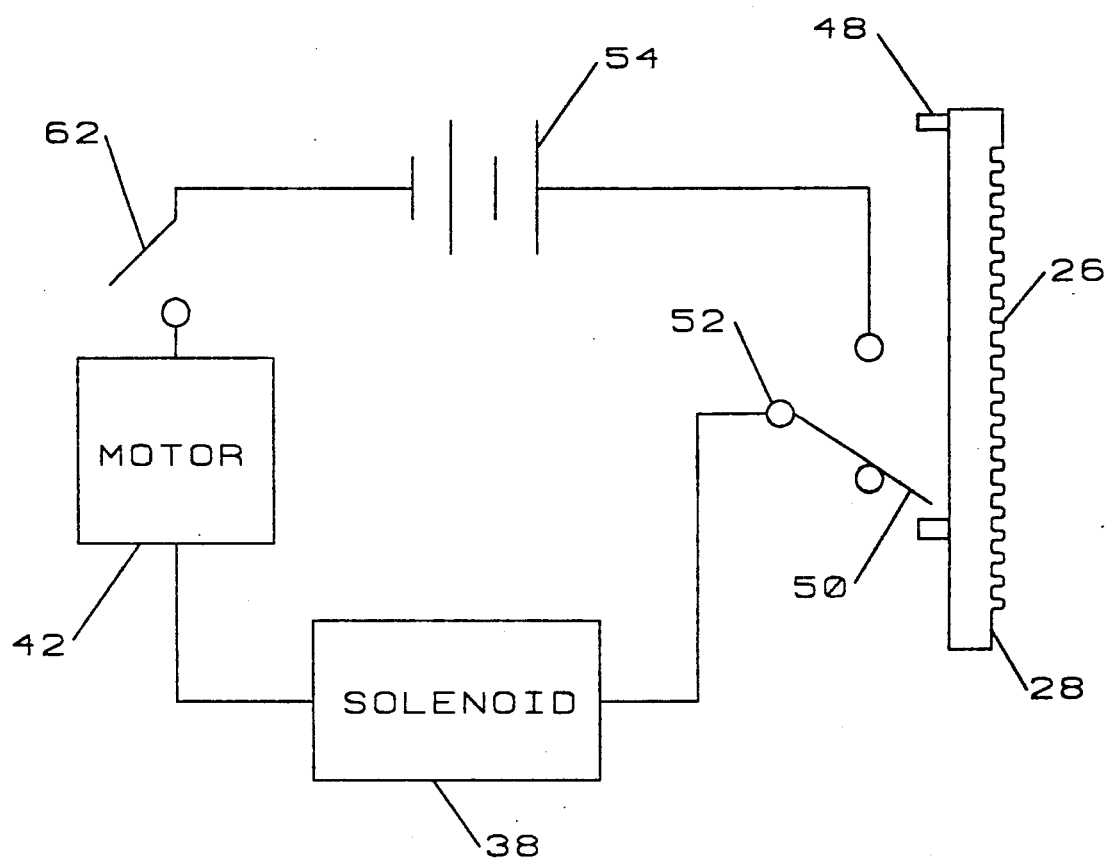
FIG. 2 is a circuit diagram showing the control circuit for the solder removal tool of FIG. 1.

In that form of the present invention chosen for purposes of illustration in the drawing, FIG. 1 shows a solder removal tool, indicated generally at 10, having a hollow, generally cylindrical barrel 12 with a nozzle 14 at the lower end 16 of the barrel 12. Within the barrel 12, a piston 18 is slideably movable and is normally urged to an upward position, as shown, by suitable resilient means, such as spring 20. Preferably, the periphery of the piston 18 carries suitable means, such as O-ring 22, to sealingly engage the inner wall of the barrel 12 so as to prevent leakage of air past the piston 18. The piston 18 also carries a shaft 24, which projects upwardly from the piston 18 and has a toothed area 26 extending along one side of the piston shaft 24 which is engageable by a movable gear 28. The gear 28 is mounted on a shaft 30 is rotatable within a bearing 32 which is mounted on the outer end 34 of shaft 36 of a suitable solenoid 38. Also, resilient means, such as spring 40 connects the bearing 32 with the wall of the barrel 12 and serves to normally urge gear 28 out of engagement with the toothed area 26 of the piston shaft 24. A motor 42 is mounted within the barrel 12 and is operable, through suitable gearing 44, to rotate the movable gear 28. The piston shaft 24 also carries a pair of studs 46 and 48 which are engageable with arm 50 of switch 52 to control actuation of the solenoid 38 and motor 42. Electrical power is preferably supplied by a rechargeable battery 54. Obviously, if desired, battery 54 could be a nonrechargeable battery which could be used until exhausted and then replaced. Alternatively, battery 54 could be omitted and electrical power could be supplied by cord 58 and plug 60 directly from the line source. A suitable "ON-OFF" switch 62 is provided to permit selective energization of the solder removal tool 10 and a trigger slide 64 is provided to control release of the piston 18 to preform the solder removal operation. The trigger slide 64 is formed with an opening 66 which encircles the piston shaft 24 and has a bevelled upper surface 68 which is engageable by a suitable stud 70 as the piston shaft 24 moves downward to cam the trigger slide 64 aside and allow passage of the upper stud 48. A spring 72 bears against the inner end 74 of the trigger slide 64 to normally urge the trigger slide 64 to a "locked" position, in which end 76 of the trigger slide 64 projects through opening 78 in the barrel 12. When stud 70 is below the trigger slide 64, the action of spring 20, urging piston 18 upward, causes stud 70 to bear against the trigger slide 64 and serves to lock the piston 18 in its "cocked" position. Subsequently, when desired, the operator presses end 76 of the trigger slide 64 inward, which releases stud 70 and allows spring 20 to drive piston 18 upward, causing a vacuum within the barrel 12 and allowing unwanted solder to be suck through nozzle 14 into the barrel 12. Preferably, the barrel 12 is removably secured to the main housing 13 by suitable means, such as threads 15, to allow removal of the barrel 12 to permit disposal of removed solder. Finally, if desired, the shaft 24 may be provided with suitable means, such as extension 80, which projects through a suitable opening 82, formed in the housing 13, to permit manual cocking of the tool 10, if necessary or desirable.

In use, the operator holds the soldering iron in one hand and holds the solder removal tool 10 in the other hand. To energize the solder removal tool 10, the operator moves switch 62 to its "ON" position. If the tool 10 is in the normal or "uncocked" position, as shown in FIG. 1, with piston 18 in the upward position, solenoid 38 will draw arm 36 inward, drawing moveable gear 28 into engagement with the toothed area 26 of piston shaft 24, against the action of spring 40. At the same time, motor 42 will act through gearing 44 to rotate the moveable gear 28, which will serve to drive piston shaft 24 and piston 18 downward, against the action of spring 20. As piston 18 approaches its lower or "cocked" position, stud 70 will engage the bevelled surface 68 of the trigger slide 64 and will force the trigger slide aside, against the action of spring 72. At about the same time, upper stud 48 of the piston shaft 24 will move arm 50 of switch 52 downward, breaking the electrical circuit. This stops motor 42 and deenergizes solenoid 38. This allows spring 40 to pull the movable gear 28 out of engagement with the toothed area 26 of the piston shaft 24. However, as stud 70 passes below the trigger slide 64, spring 72 urges the trigger slide 64 to its "locked" position, overlying stud 70 of the piston shaft 24. This prevents upward movement of the piston 18 and maintains the solder removal tool in its "cocked" position.

When desired, the operator presses end 76 of the trigger slide 64 inward against the action of spring 72, which disengages the trigger slide 64 from stud 70 of the piston shaft 24 and allows spring 20 to drive the piston 18 and piston shaft 24 upward. Because O-ring 22 prevents passage of air about the piston 18, the upward movement of the piston 18, by spring 20, creates a vacuum within the barrel 12 and causes unwanted solder to be sucked through nozzle 14 into the barrel 12 of the solder removal tool 10. When the piston 18 reaches its upward position, stud 46 on the piston shaft 24 moves arm 50 of switch 52 upward. This completes the electrical circuit to solenoid 38 and motor 42. Consequently, solenoid 38 draws arm 36 inward to move the movable gear 28 into engagement with the toothed area 26 of the piston shaft 24, against the action of spring 72. Motor 42 then acts through gearing 44 to rotate the movable gear 28 to drive the piston shaft 24 and piston 18 downward, against the action of spring 20 to return the solder removal tool 10 to its "cocked" position in readiness for a subsequent solder removal operation.

It should be noted that the only action required of the operator is the pressing of end 76 of the trigger slide 64 to release piston 18. This performs the solder removal operation and the solder removal tool 10 rearms itself automatically, without any additional physical or mental action by the operator, in preparation for a subsequent solder removal operation. Thus, the operator is free to concentrate on performing the soldering and desoldering operations, without the distraction and inconvenience of having to repeatedly recock the solder removal tool 10.

Obviously, numerous variations and modifications can be made without departing from the spirit of the present invention. Therefore, it should be clearly understood that the form of the present invention described above and shown in the figures of the accompanying drawing is illustrative only and is not intended to limit the scope of the present invention.

What is claimed is:

1. A solder removal tool comprising:
   a hollow barrel having a nozzle opening at one end of said barrel, said hollow barrel to retain molten excess solder removed from a connection site,
   a piston slideable within said barrel to create a vacuum within said barrel,
   trigger means for releasably locking said piston in a "cocked" position,
   resilient means normally urging said piston to an "uncocked" position,
   means for automatically returning said piston to said "cocked" position in response to movement of said piston to said "uncocked" position, and
   a shaft carried by said piston having a stud engageable by said trigger means to retain said piston in said "cocked" position and releasable upon movement of said trigger means to allow movement of said piston to said "uncocked" position.

2. The tool of claim 1 wherein: said means for automatically returning said piston comprises:
   a toothed area formed on said shaft,
   a gear movable between a first position engaging said toothed area and a second position out of engagement with said toothed area, means for selectably causing said movable gear to move between said first and second positions, and a motor for rotating said movable gear to drive said piston to said "cocked" position.

3. The tool of claim 2 further comprising:

an electrical circuit including a source of electrical energy connectable to energize said motor, a switch included in said circuit having an arm movable between a first position to complete said circuit and a second position to break said circuit, and means carried by said shaft for moving said arm.

4. The tool of claim 3 wherein:

said source of electrical energy is a battery.

5. The tool of claim 4 wherein:

said battery is rechargeable.

6. The tool of claim 3 wherein:

said source of electrical energy is line voltage.

7. The tool of claim 2 wherein:

said means for causing movement of said movable gear comprises:

a solenoid having an arm connected to said gear and actuable to move said gear into engagement with said toothed area of said shaft, and resilient means normally urging said gear out of engagement with said toothed area.

8. The tool of claim 1 further comprising:

resilient means normally urging said trigger means to the position in which it locks said piston.

9. The tool of claim 1 wherein:

said barrel is removable from said tool to permit removal of hardened solder contained therein.

10. The tool of claim 3 wherein:

said means for moving the arm of said switch comprises:

a first stud mounted in a first position on said shaft and engageable with said switch arm as said piston approaches its "uncocked" position to cause said switch to complete said circuit, and a second stud mounted in a second position on said shaft and engageable with said switch arm as said piston approaches its "cocked" position to cause said switch to break said circuit.

11. The tool of claim 1 further comprising:

manually operable means connected to said trigger means and projection externally of said tool to permit manual cocking of said trigger means.

12. The tool of claim 1 wherein:

said barrel is removably secured to said tool.

* * * * *